(12) United States Patent
Chambert

(10) Patent No.: US 9,840,342 B2
(45) Date of Patent: Dec. 12, 2017

(54) DEVICE FOR SENSING AND CAPTURING A SPACE OBJECT, INCLUDING A PRESSURE ELEMENT AND AT LEAST TWO RECLOSABLE ELEMENTS

(71) Applicant: Airbus Defence and Space SAS, Les Mureaux (FR)

(72) Inventor: Matthieu Chambert, Bezons (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 51 days.

(21) Appl. No.: 14/896,488

(22) PCT Filed: Jun. 6, 2014

(86) PCT No.: PCT/EP2014/061850
§ 371 (c)(1),
(2) Date: Dec. 7, 2015

(87) PCT Pub. No.: WO2014/195468
PCT Pub. Date: Dec. 11, 2014

(65) Prior Publication Data
US 2016/0130020 A1    May 12, 2016

(30) Foreign Application Priority Data
Jun. 7, 2013  (FR) ...................... 13 55277

(51) Int. Cl.
*B64G 4/00*   (2006.01)
*B64G 1/64*   (2006.01)
*B64G 1/10*   (2006.01)

(52) U.S. Cl.
CPC ............. *B64G 4/00* (2013.01); *B64G 1/1078* (2013.01); *B64G 1/646* (2013.01); *B64G 1/64* (2013.01)

(58) Field of Classification Search
CPC .......... B64G 1/078; B64G 1/222; B64G 1/64; B64G 1/641; B64G 1/646; B64G 4/00;
(Continued)

(56) References Cited

U.S. PATENT DOCUMENTS 3,193,213 A * 7/1965 Eberwine ............... B64G 1/646
213/88
3,465,986 A * 9/1969 Milly ..................... B64G 1/646
244/172.4

(Continued)

FOREIGN PATENT DOCUMENTS

| JP | H05254498 | 10/1993 |
| WO | 2005110847 | 11/2005 |

OTHER PUBLICATIONS

International Search Report, dated Aug. 27, 2014.

*Primary Examiner* — Richard R Green
*Assistant Examiner* — Brady W Frazier
(74) *Attorney, Agent, or Firm* — Greer, Burns & Crain, Ltd.

(57) ABSTRACT

A device for capturing a space object, the device comprising a pressure element configured to come into direct mechanical contact with the space object to be captured. The device comprises at least two reclosable elements movable between an open position for capturing the space object and a closed position for retaining the space object. The device also comprises an apparatus to mechanically transmit movement from the pressure element to each reclosable element, the mechanical transmission apparatus being configured to entrain each reclosable element in displacement between the open position and the closed position by pressure of the space object on the pressure element.

15 Claims, 9 Drawing Sheets

US 9,840,342 B2
Page 2

(58) Field of Classification Search
CPC .. A61B 34/30; A61B 2034/305; A01M 23/24; A01M 23/245; A01M 23/26; A01M 23/265; B66C 1/422; B66C 1/442
USPC ...... 244/172.4, 172.5; 43/88, 89, 90, 92, 94, 43/95; 294/110.1
See application file for complete search history.

(56) References Cited

U.S. PATENT DOCUMENTS

| | | | | |
|---|---|---|---|---|
| 3,608,848 A * | 9/1971 | Cantor | ............... | B64G 1/646 244/172.4 |
| 4,219,171 A * | 8/1980 | Rudmann | ............ | B64G 1/646 244/172.4 |
| 4,260,187 A | 4/1981 | Frosch et al. | | |
| 4,262,952 A * | 4/1981 | Bradley | ................ | B66C 1/422 294/110.1 |
| 4,549,367 A * | 10/1985 | Jones, Sr. | .............. | A01M 23/26 43/88 |
| 4,712,753 A * | 12/1987 | Howard | ................ | B64G 1/646 244/116 |
| 4,766,693 A * | 8/1988 | Splawinski | ........... | A01M 23/26 43/88 |
| 4,929,009 A * | 5/1990 | Vandersluis | ............ | B25J 15/02 244/172.5 |
| 5,257,761 A * | 11/1993 | Ratz | ...................... | B64G 1/402 156/172 |
| 5,390,288 A | 2/1995 | Toda et al. | | |
| 6,840,481 B1 * | 1/2005 | Gurevich | ............... | B64G 1/646 244/172.4 |
| 6,969,030 B1 * | 11/2005 | Jones | ...................... | B64G 1/646 244/115 |
| 8,366,162 B2 * | 2/2013 | Imlach | ..................... | B66C 1/30 294/110.1 |
| 9,399,295 B2 * | 7/2016 | Roberts | ................ | B25J 15/0226 |
| 2002/0063188 A1 * | 5/2002 | Steinsiek | ............. | B64G 1/1078 244/172.4 |
| 2002/0135192 A1 * | 9/2002 | Alexander, III | ........... | B66C 1/58 294/110.1 |
| 2007/0039232 A1 * | 2/2007 | Butera | ................... | A01M 23/26 43/88 |
| 2008/0257485 A1 | 10/2008 | Xie et al. | | |
| 2010/0193640 A1 * | 8/2010 | Atmur | ..................... | B64G 1/242 244/158.2 |
| 2010/0252177 A1 | 10/2010 | Sargent et al. | | |
| 2012/0076629 A1 * | 3/2012 | Goff | ........................ | B25J 9/1612 414/730 |
| 2013/0075534 A1 | 3/2013 | Taylor et al. | | |

* cited by examiner

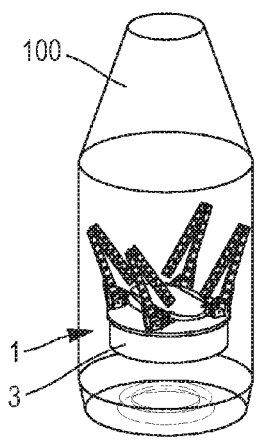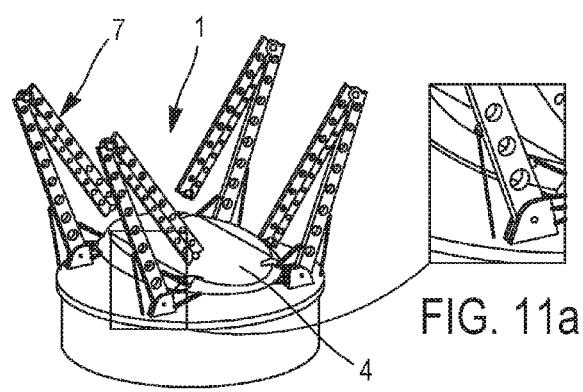
FIG. 10          FIG. 11          FIG. 11a
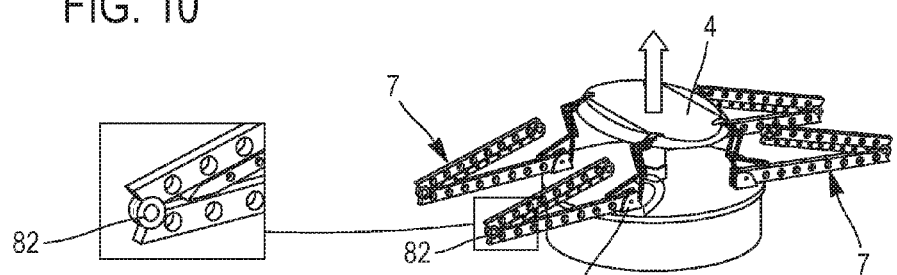
FIG. 12a          FIG. 12
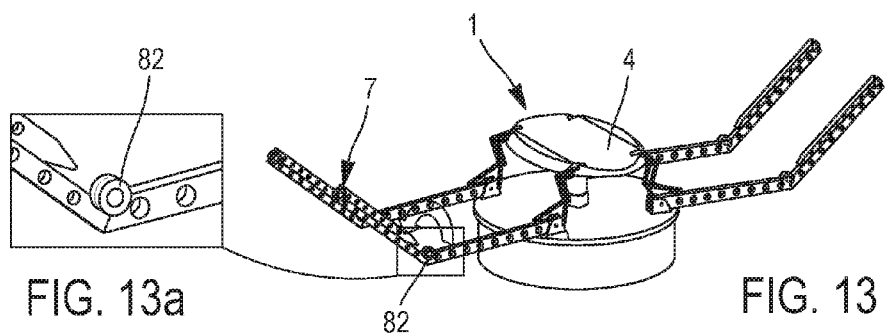
FIG. 13a          FIG. 13
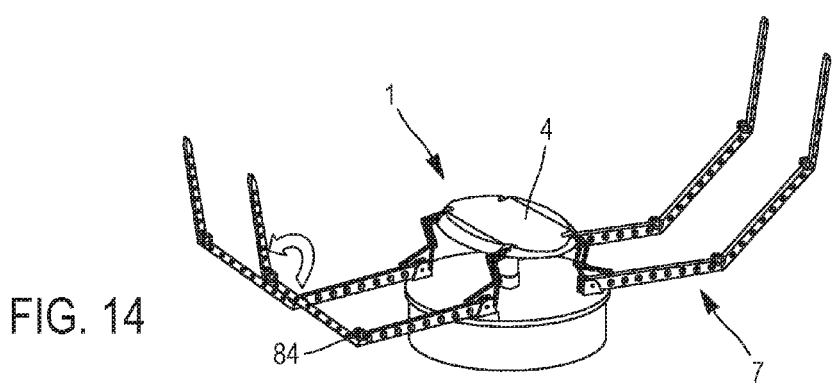
FIG. 14

DEVICE FOR SENSING AND CAPTURING A SPACE OBJECT, INCLUDING A PRESSURE ELEMENT AND AT LEAST TWO RECLOSABLE ELEMENTS

CROSS-REFERENCES TO RELATED APPLICATIONS

This application claims the benefit of the French patent application No. 1355277 filed on Jun. 7, 2013, the entire disclosures of which are incorporated herein by way of reference.

BACKGROUND OF THE INVENTION

The invention relates to the domain of space applications. More precisely, the invention relates to devices for capturing a space object.

Proliferation in space of debris in orbit around the Earth creates major problems in terms of costs and safety, particularly for space flights and for active satellites.

Different systems for capturing this debris have been proposed and even implemented in order to reduce their number. Captured debris is then brought into the atmosphere for destruction, or is definitely pushed away from the Earth so that it only forms a reasonable and acceptable danger.

Known capture devices according to the prior art include some with severe constraints particularly in terms of mass and size, which results in very high costs. Others have many sophisticated electronic and electromechanical items of equipment. The result is higher costs, greater complexity and a reduction in the reliability of these devices. Finally, known devices are too frequently dedicated to the capture of specific types of objects under specific conditions, which leads to a very expensive increase in the number of capture devices to be used.

SUMMARY OF THE INVENTION

The invention is intended to at least partially solve problems encountered in solutions according to the prior art.

In this respect, the purpose of the invention is a device for capturing a space object, including:
- a pressure element configured to come into direct mechanical contact with the space object to be captured;
- at least two reclosable elements free to move between an open position ready for capturing the space object and a sealed position for retaining the space object;
- a means of mechanically transmitting movement from the pressure element to each reclosable element, the mechanical transmission means being configured to entrain each reclosable element in displacement between the open position and the closed position by pressure of the space object on the pressure element.

The device comprises a support, the mechanical transmission means also comprising:
- at least one support bar on which the pressure element is located, the support bar being configured to move the pressure element in translation relative to the support;
- at least one connecting rod mechanically connecting the pressure element to one of the reclosable elements;
- at least one hinge located between the support and the reclosable element, the connecting rod making the reclosable element pivot about the hinge during the translation displacement of the pressure element relative to the support.

The capture device is configured so that it can be actuated largely mechanically by pressure of the space object on the pressure element. The displacement of reclosable elements between the open position and the closed position takes place particularly independently and passively. In particular, the capture device does not include any complex electrical, electromechanical or electronic reclosing opening and/or closing means for the reclosable elements, such as a plurality of motors or complex control means. Thus, the capture device is very reliable. Furthermore, energy released by mechanical contact of the capture device with the space object is sufficient or almost sufficient to capture the space object.

Due to its relatively simple mechanics, the capture device has a relatively low mass. It is also capable of capturing a wider variety of space objects. In particular, the capture device is capable of capturing space objects with very variable geometries.

Within the scope of the invention, the support may have various natures. In particular, the capture device may be configured to remain fixed to the space vehicle, for example rigidly, during capture or to remain attached to the space vehicle through a cable.

The space vehicle that has transported the capture device and/or the capture device also include at least one sensor to evaluate the relative position of the space object and the capture device, and means of propulsion in space.

The invention may optionally comprise one or several of the following characteristics that may or may not be combined together:

The capture device may be configured in particular to capture a satellite, a part of a satellite, a space vehicle or a part of a space vehicle in orbit, and also particularly all or some of an upper stage of a launcher.

Preferably, the pressure element is configured to have a large area relative to the size of the device, in order to facilitate capture of the space object. Consequently, the pressure element may for example be a pressure plate.

Furthermore, the pressure element may be configured to have higher mechanical strength than the reclosable elements.

The capture device is preferably configured so that the pressure element comes into direct mechanical contact with the space object in the open position, particularly before any direct mechanical contact of the reclosable elements with the space object.

With such a configuration, the capture device also is robust, capture of the space object requires only low precision and capture is correspondingly easier. Furthermore, due to the robustness and particularly the simplicity of its mechanism, the capture device is particularly compatible with the organization of a new attempt to capture the space object if a previous capture attempt is unsuccessful.

The space object could bounce on the pressure element during a capture attempt or under the effects of inertia forces, and this could cause subsequent reopening of the reclosable elements and unwanted release of the space object. Consequently, the mechanical transmission means preferably comprises a means of blocking at least one of the reclosable elements in the closed position.

The blocking means is configured to prevent subsequent displacement of the reclosable element from the closed position to the open position once the space object has come into contact with the pressure element. Preferably, the blocking means is configured particularly to prevent reopening of the reclosable element throughout its displacement from the open position to the closed position. Furthermore, when the capture device is transported, the blocking means may also prevent accidental displacement of the reclosable elements from a transport position to the open position.

When the capture device comprises a blocking means, the mechanical transmission means also preferably comprises a means of releasing the blocking means.

The means of releasing the blocking means can reopen each reclosable element. The means of releasing the blocking means can contribute in particular to performing a new capture attempt if the first capture attempt is unsuccessful. Furthermore, the means of releasing the blocking means can also be used for extending reclosable elements from the transport position to the open position.

The blocking means is preferably released by releasing mechanical energy stored when the reclosable elements are closed, particularly elastic potential energy.

For example, the blocking means comprises a rack and at least one ratchet, the ratchet being configured to engage into the rack forming a non-return device.

As an alternative, the blocking means may comprise a notched wheel and at least one ratchet, the ratchet being configured to engage with the notched wheel forming a non-return device.

In each of the above two configurations, the means of releasing the blocking means preferably comprises a wire fixed to the ratchet.

When the blocking means is a notched wheel, the metal wire preferably passes through the center of the notched wheel, the blocking means being released by pulling the metal wire from the center of the notched wheel.

With such a configuration of the capture device, it is possible in particular to release a plurality of ratchets simultaneously by means of a remote control means acting from a central control.

It is preferable that each reclosable element is an articulated capture arm comprising a plurality of articulation segments.

Each articulated arm is then preferably configured so that it can be folded into a special position for transport of the device.

Reclosable elements are then configured so that they can be folded into a transport position when the device is integrated into a space vehicle, so as to limit the size of the capture device during its transport.

When the space vehicle is located close to the space object to be captured, the device is configured such that the reclosable elements move from the transport position to the open position.

The capture device of the space object preferably includes at least one additional means of securing the capture, configured to retain the captured space object once the reclosable elements are in the closed position.

The device thus preferably comprises at least one secondary contact element free to move between an extended position and a position in which the captured space object is secured, the secondary contact element being configured to remain in the extended position during displacement of the reclosable elements from the open position to the closed position.

In other words, when the capture device comprises a secondary contact element, the secondary contact element is configured so that its displacement from the extended position to the secure position takes place later than the displacement of the reclosable elements from the open position to the closed position.

In particular, the capture device may be configured so that displacement of the secondary contact element from the extended position to the secure position takes place; either after the reclosable elements have only partly moved from the open position to the closed position, or only after the reclosable elements are in the closed position.

The secondary contact element is preferably configured to be in a secure position only when the reclosable elements are already in the closed position.

The secondary contact element may have different natures, for example a pressure contact element, an articulated capture arm or an articulation segment of a capture arm.

The capture device preferably comprises a mechanical shock absorber, particularly present on the pressure element and/or on at least one of the reclosable elements.

The shock absorber is preferably a deformable buffer. The deformable buffer is preferably configured to approximately match the shape of the space object. It may particularly be a structure or a foam, possibly honeycombed, and particularly made from a metallic material comprising more than 50% by mass of aluminum.

The capture device preferably also comprises a reversible adhesive comprising a plurality of filaments configured to create Van der Waals forces with the space object. Such materials are also known under the term "gecko type materials." Examples of these materials have been described in documents U.S. 2010/0252177 and U.S. 2008/0257485

As a variant, the capture device may include other types of adhesives. In particular, the device may include an adhesive surface comprising an adhesive sensitive to pressure, for example an adhesive known under the name "Scotch®."

Regardless of the nature of the adhesive, the adhesive is preferably located on the surface of the pressure element, an inner surface of one or several reclosable elements or on the inner surface of one or several secondary contact elements.

The capture device is preferably symmetric by plane symmetry.

In particular, the mechanical transmission means preferably comprises a plurality of mechanical transmission elements, each mechanically connected directly to one of the reclosable elements, the reclosable elements and the mechanical transmission elements being arranged approximately symmetrically either by plane symmetry or by axial symmetry, preferably along an axis orthogonal to the plane of the support.

The invention also relates to a method of capturing a space object comprising a prior step in which the capture device as defined above is transported close to the space object, the capture device having a relative low velocity relative to the space object during capture, step during which the reclosable elements are in the open position immediately before capture, the reclosable elements moving from the open position to the closed position by pressure of the space object on the pressure plate.

The capture method preferably comprises an additional step to secure capture of the space object, step during which the secondary contact element moves from the extended position to the secure position, the reclosable elements already having begun their displacement from the open position to the closed position. Furthermore, the step to secure the capture preferably takes place due to the release of previously stored mechanical energy, particularly elastic potential energy stored by a passive elastic energy storage system activated when the reclosable elements are closed.

BRIEF DESCRIPTION OF THE DRAWINGS

This invention will be better understood after reading the description of example embodiments given purely for information and in no way limitative, with reference to the appended drawings in which:

FIGS. 10 to 14 show sequences in the method of extension of another preferred embodiment of the invention, FIGS. 11a, 12a and 13a being enlargements of FIGS. 11, 12, 13 and 14 respectively, giving details of the position of the reclosable elements and hinges.

DETAILED DESCRIPTION OF THE PREFERRED EMBODIMENTS

Identical, similar or equivalent parts of the different figures have the same numeric references so as to facilitate changing from one figure to another.

Figure 1:
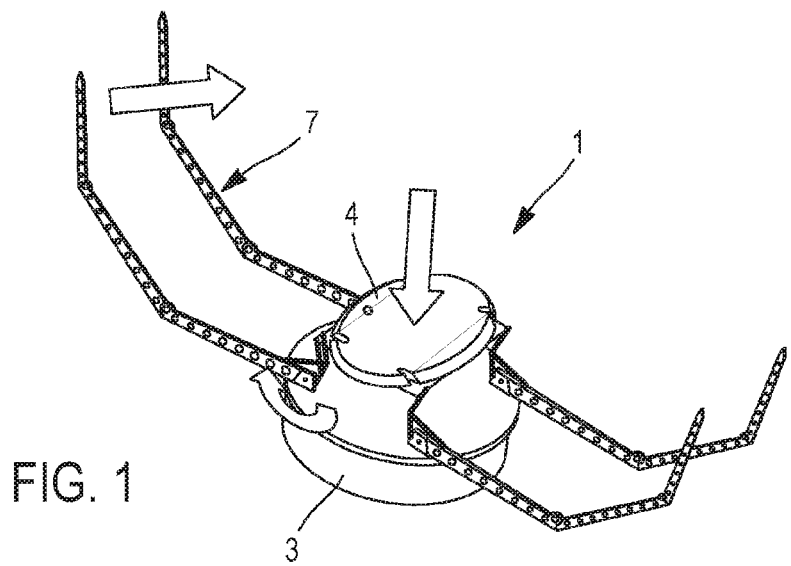
FIG. 1 is a perspective view of a capture device illustrating one embodiment of the invention.
Figure 2:
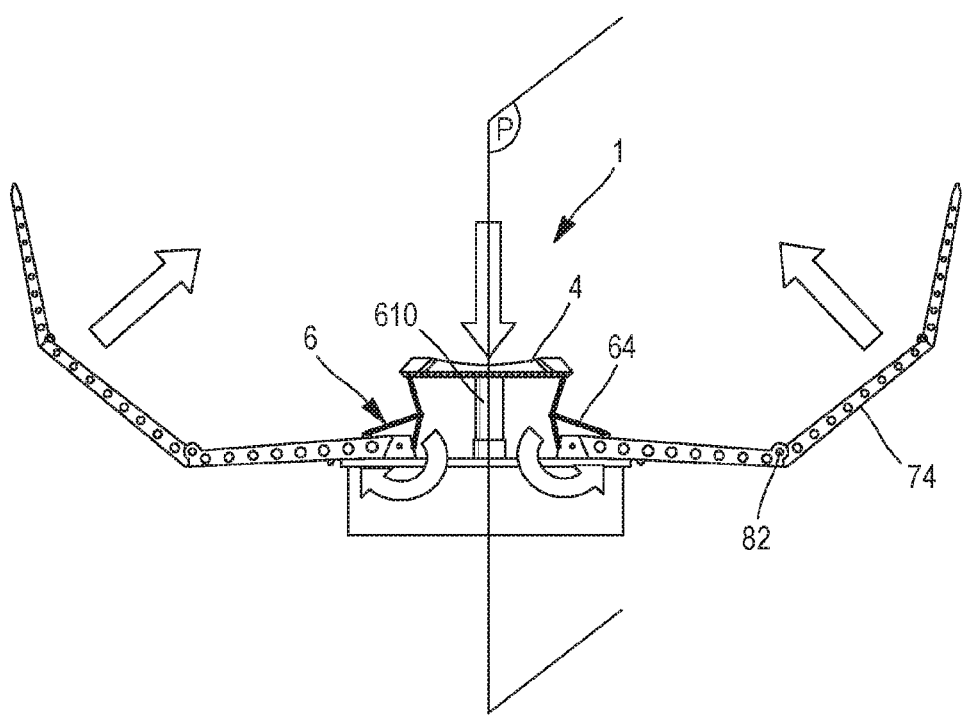
FIG. 2 is a side view of the capture device in FIG. 1.

FIG. 1 and FIG. 2 show a device 1 for capture of a space object 2. The capture device 1 is approximately symmetric by plane symmetry about plane P. The device 1 comprises a support 3 shown diagrammatically and four reclosable elements 7 installed on the support 3, the reclosable elements 7 being used to capture the space object 2. The reclosable elements 7 are free to move between an open position ready for capture of the space object 2 and a closed position for retention of the space object 2. Reclosable elements 7 are shown in the open position in these two figures. The reclosable elements 7 will be described in more detail with reference to FIG. 9.

The support 3 may have various natures depending on the mechanical connection between the capture device 1 and the space vehicle (not shown) used for transport of the device 1. In particular, the support 3 may for example be a part of the main structure of the space vehicle, the extension of an arm (not shown) fixed to the space vehicle or an element attached to a cable (not shown) connecting it to the space vehicle.

With reference to FIG. 10, during its transport inside a space launcher (not shown) comprising the space vehicle, the capture device 1 is preferably configured to occupy a reduced space corresponding to not more than the space 100 necessary for an average load also known as "volume under cap" of the launcher. In particular, the launcher or the space vehicle that it contains can transport several capture devices during each voyage. The launcher is preferably a standard commercial launcher, for example, of the Ariane®, Soyouz®, Vega®, etc., family.

With reference to FIGS. 1 to 9, the capture device 1 comprises a pressure element 4 configured to come into direct mechanical contact with the space object 2 to be captured when the reclosable elements 7 are in the open position.

The capture device 1 is configured particularly so that the pressure element 4 comes into mechanical contact with the space object 2 before any mechanical contact of the reclosable elements 7 with the space object 2.

In these figures, the pressure element is a pressure plate 4 and is covered by a mechanical shock absorber 400. The shock absorber 400 in the embodiments shown in FIGS. 1 to 9 is a deformable buffer configured to approximately match the shape of the space object 2. The deformable buffer is particularly a honeycomb structure or foam, containing more than 50% by mass of aluminum.

The shock absorber 400 is preferably made so as to form a plurality of successive layers configured to enable successive shock absorbing and/or configured to at least partly preserve the mechanical performances of the shock absorber 400 during a subsequent capture attempt if any.

The surface of the pressure element 4 is also covered by a reversible adhesive 500 to fix the capture device 1 and the space object 2 to each other. The shock absorber 400 and the reversible adhesive 500 are particularly capable of limiting bounce of the space object 2 on the pressure element 4. Thus, they limit unwanted reopening of the reclosable elements 7 when they surround the space object 2. The reversible adhesive 500 is located particularly on a major part or even on the entire direct mechanical contact surface between the capture device 1 and the space object 2.

The reversible adhesive 500 comprises a plurality of filaments configured to form Van der Waals forces with the space object 2. Such reversible adhesives 500 are also known as "gecko type materials." For example, they are manufactured by the "BAE Systems" Company.

The pressure element 4 of the device 1 shown in FIGS. 1 to 9 is free to move relative to the support 3 with a translation movement. Consequently, the capture device 1 comprises a means 6 of mechanically transmitting the movement from the pressure element 4 to each reclosable element 7. The mechanical transmission means 6 is configured to move each reclosable element 7 in displacement between the open position and the closed position when the space object 2 applies pressure on the pressure element 4.

The mechanical transmission means 6 comprises a support bar 610 on which the pressure element 4 is located. According to the embodiment shown in FIGS. 1 to 9, the pressure element 4 is fixed relative to the support bar, the support bar 610 being installed free to slide in the hollow support 3.

Figures 6, 6A, 6B:
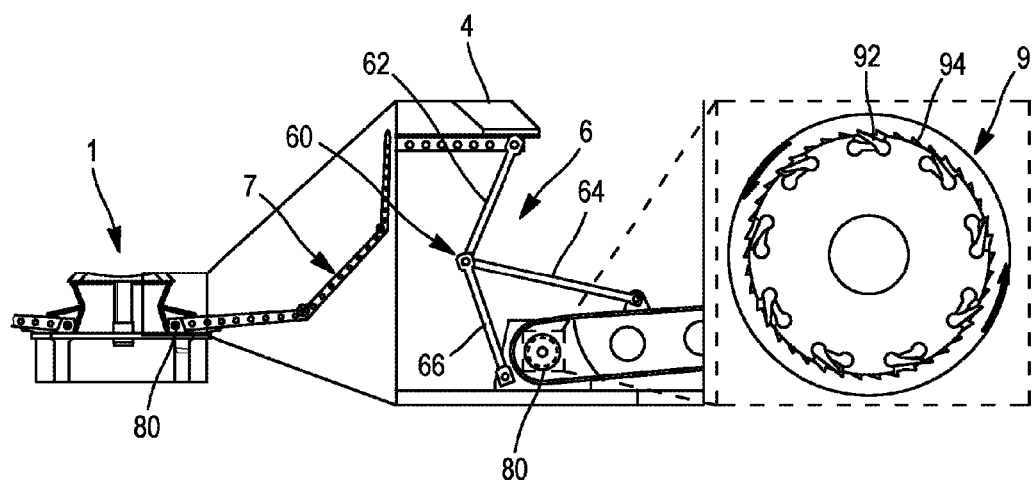
FIGS. 6 and 6a partially show the mechanical means of transmitting movement in one embodiment of the invention, FIG. 6a being an enlargement of FIG. 6.
FIG. 6b is an enlargement of FIG. 6a, showing a first embodiment of the blocking means of a capture device according to the invention.
Figure 18:
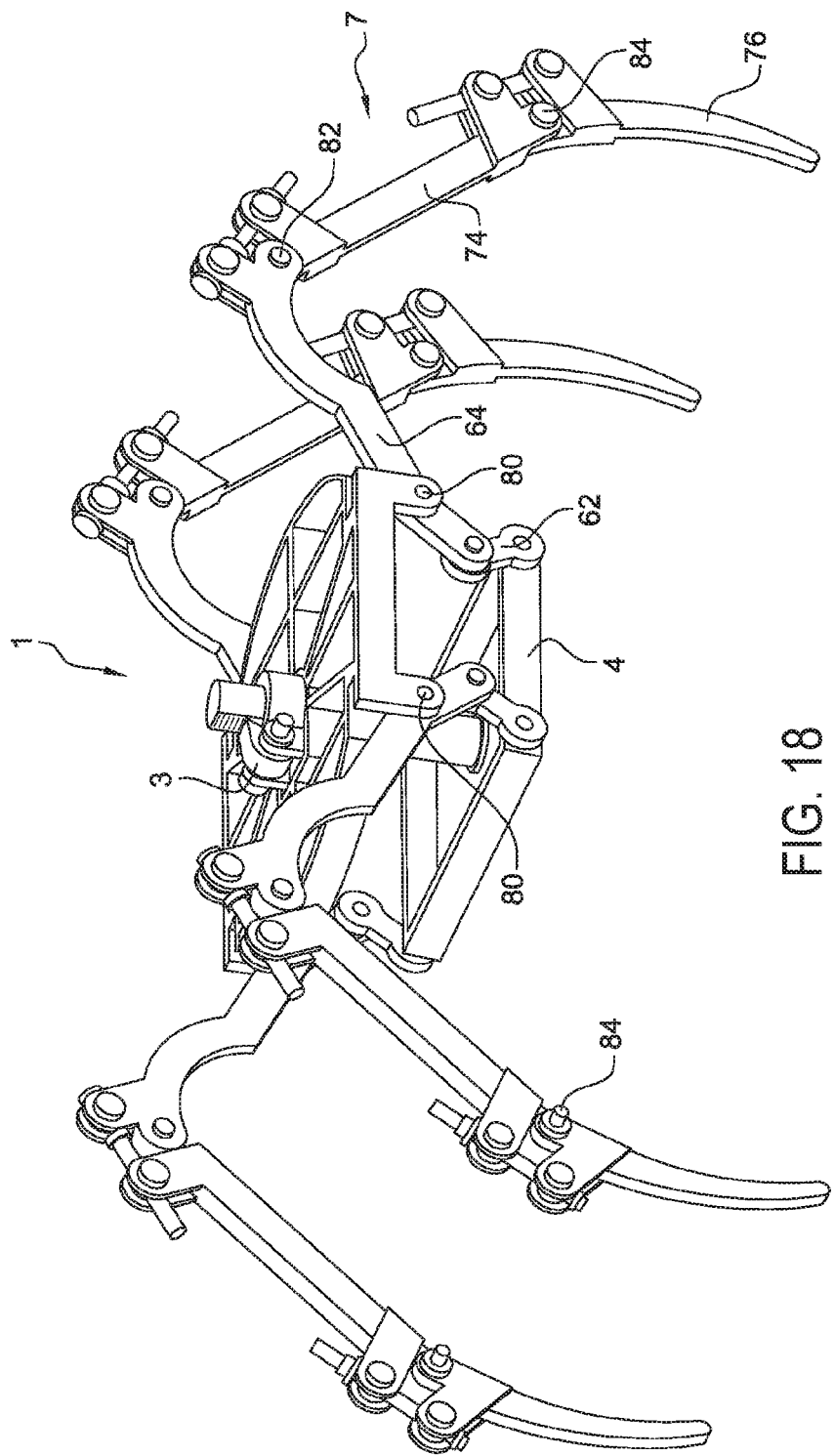

The mechanical transmission means 6 comprises a plurality of mechanical transmission elements 60 shown in more detail in FIGS. 6, 6a and 18. Each mechanical transmission element 60 is directly mechanically connected to one of the reclosable elements 7 and to the pressure plate 4, so as to actuate displacement of this reclosable element 7 between the open position and the closed position by displacement of the pressure element 4 relative to the support 3.

More precisely, the mechanical transmission elements 60 are configured so that each reclosable element 7 is free to pivot about a hinge 80 making the mechanical junction between the support 3 and the reclosable element 7.

With reference to FIGS. 6 and 6*a*, each mechanical transmission element 60 comprises three connecting rods 62, 64, 66 connected concurrently by a central connecting hinge. The connecting rods 62, 64, 66 are configured to make the reclosable element 7 pivot about hinge 80.

In the variant embodiment in FIG. 18, each mechanical transmission element 60 comprises two connecting rods 62, 64 instead of three. In this case, the geometry of the base of the reclosable elements 7 is adapted accordingly.

Figure 7:
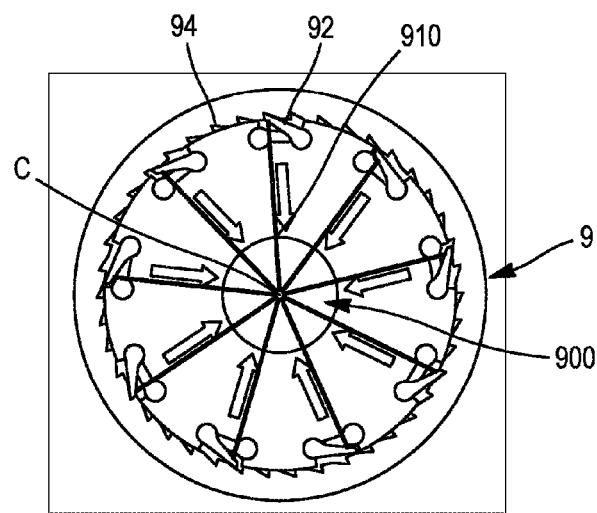
FIG. 7 shows a preferred embodiment of the means for releasing the blocking means in FIG. 6b.
Figure 8:
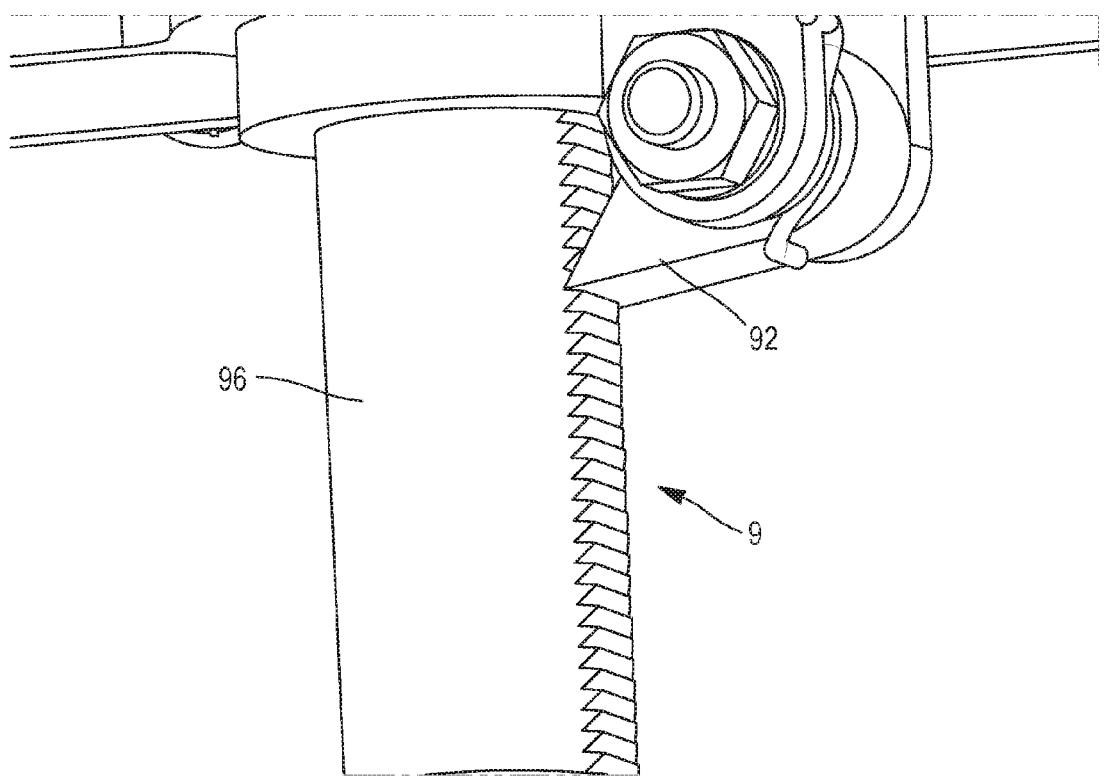
FIG. 8 is a partial perspective view of a blocking means presented as an alternative to that in FIG. 6b.

With reference more specifically to FIGS. 6*b*, 7 and 8, the mechanical transmission means 6 comprises a means 9 for blocking at least one of the reclosable elements 7 in the closed position. Preferably, each mechanical transmission element 60 comprises a blocking means 9.

The blocking means 9 is configured to form a non-return device preventing reopening of the reclosable element 7, once the reclosable element 7 is approximately in the closed position. The blocking means 9 is configured in particular to prevent reopening of the reclosable element 7 throughout its displacement from the open position to the closed position. The blocking means 9 may be made in various ways.

According to a first embodiment of the blocking means 9 shown in FIGS. 6*b* and 7, the blocking means 9 comprises a notched wheel 94 and at least one ratchet 92, preferably a plurality of ratchets 92, stopping in the notches formed by the notches of the notched wheel 94.

The ratchets 92 are configured so that they will only enable rotation of the notched wheel present at the hinge 80 in the direction corresponding to displacement of the reclosable element 7 from the open position to the closed position.

According to one variant embodiment of the blocking means 9 shown in FIG. 8, the blocking means 9 comprises a rack 96 and at least one ratchet 92, the ratchet 92 being configured to engage in the rack 96.

Similarly, the ratchet 92 can only move in the direction corresponding to displacement of the reclosable element 7 from the open position to the closed position, along the rack 96.

When the mechanical transmission means 6 comprises a blocking means 9, the mechanical transmission means 6 also comprises a means 900 of releasing the blocking means 9, particularly to allow a subsequent attempt to capture the space object 2, if any.

FIG. 7 shows a means 900 of releasing the blocking means 9 corresponding to the first embodiment of the blocking means 9. The means 900 of releasing the blocking means 9 comprises a plurality of metal wires 910 each fixed to one of the ratchets 92. The blocking means 9 is released by tension on each metal wire 910 from the center C of the notched wheel 94 through which each metal wire 910 passes. The removable part of each ratchet 92 configured to engage in the notches of the notched wheel 94 then moves away from the periphery of the notched wheel, which enables rotation of the notched wheel 94 along the direction corresponding to the displacement of the reclosable element 7 from the closed position to the open position.

Figure 9:
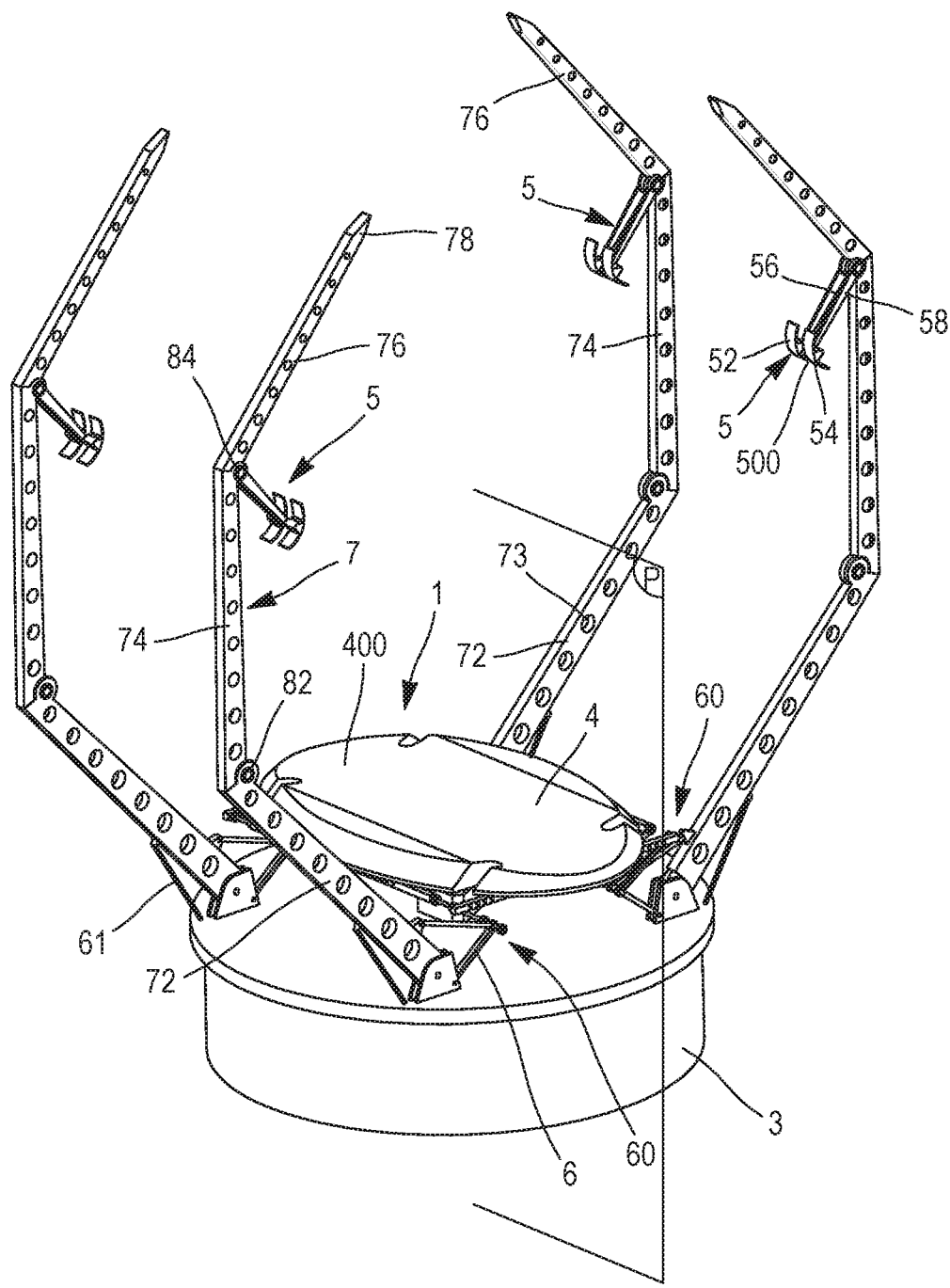
FIG. 9 is a perspective view of a preferred embodiment of the capture device according to the invention in a configuration including secondary contact elements at the ends of capture arms.

Also with reference to FIG. 9, the means 900 of releasing the blocking means takes place by release of mechanical energy stored during closing of the reclosable elements 7. This mechanical energy originates from the elastic potential energy stored by the springs 61 fixed to each reclosable element 7.

FIGS. 3*a*, 4*a* and 5*a*, and FIGS. 3*b*, 4*b* and 5*b* respectively show three distinct alternative embodiments of a means of controlling closing of the mechanical transmission means 6 at the end of capture, the blocking means 9 and the means 900 of releasing blocking means not being shown in these figures to improve readability. The mechanical transmission means 6 of each of these embodiments comprises an additional mechanical means of controlling the displacement of reclosable elements 7, configured to adapt and regulate tightening of reclosable elements around the space object 2 in the closed position. In particular, the additional means is configured so that the reclosable elements 7 can be tightened around the space object 2 if necessary or otherwise loosened.

Figure 3A:
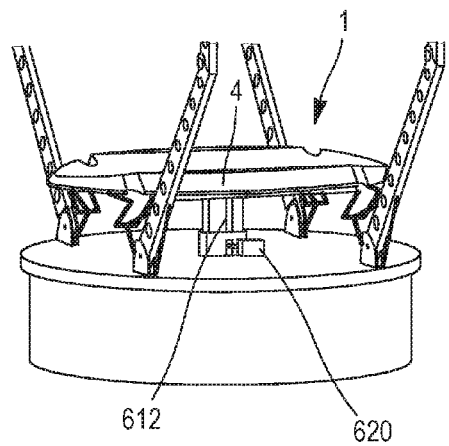
FIGS. 3a, 4a, 5a, are partial diagrammatic perspective views illustrating several distinct embodiments of the invention including optional characteristics necessary for fine adjustment of the closed position.
Figure 3B:
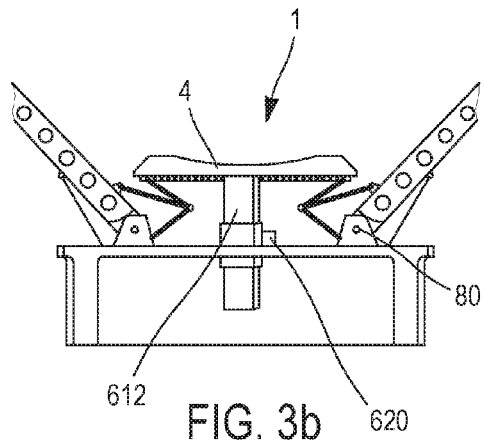
FIGS. 3b, 4b, 5b are partial sectional views of embodiments illustrated in FIGS. 3a, 4a, 5a respectively.

The mechanical transmission means 6 of the device 1 in FIGS. 3*a*, 3*b* is different from the means in FIGS. 1 and 2 in that the support bar 610 comprises a blind groove 612 in which a toothed wheel fixed onto the rod of a motor 620 engages. The motor 620 is used to correct displacement of the pressure element 4 fixed to the support bar 610 relative to the support 3. Preferably, the mechanical transmission means 6 comprises a motor-driven system to engage/release the rod of the motor 620 from the groove 612 when the space object 2 is captured. The motor-driven system in particular enables free displacement of the pressure element 4, as long as the motor-driven system is not actuated.

Figure 4A:
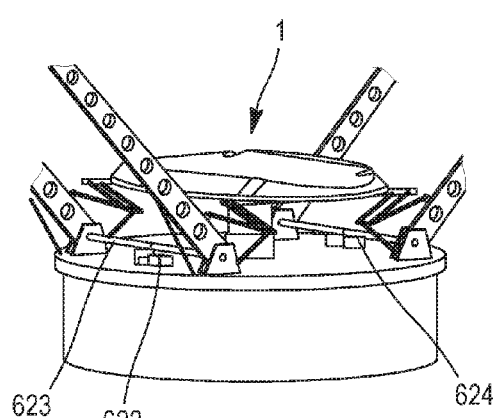
Figure 4B:
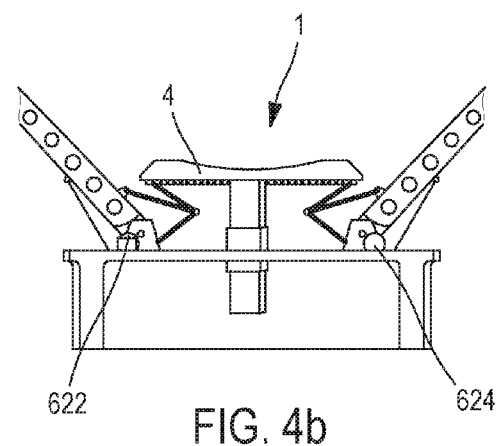

The mechanical transmission means 6 of the device 1 in FIGS. 4*a*, 4*b* is different from that in FIGS. 1 and 2 in that it also comprises two transmission rods 623 each mechanically connecting the hinges 80 to the base of two consecutive reclosable elements 7, and two motors 622, 624 each located on one of the transmission rods 623.

Figure 5A:
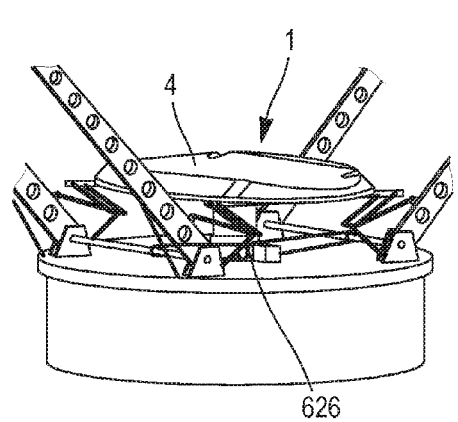
Figure 5B:
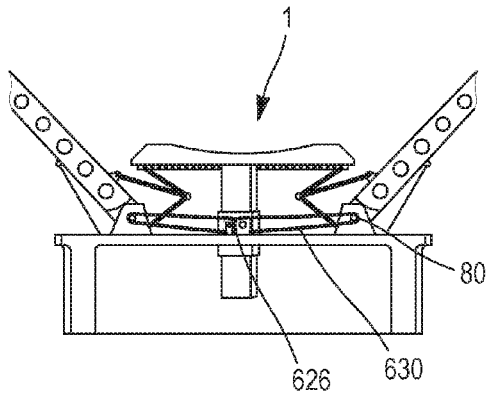

The mechanical transmission means 6 of the device 1 in FIGS. 5*a*, 5*b* is different from that in FIGS. 1 and 2 in that it comprises two transmission rods 623 each mechanically connecting the hinges 80 to the base of two consecutive reclosable elements 7, a motor 626 and a belt 630 mechanically connecting the transmission rods 623 and the motor 626. The mechanical transmission means 6 in FIGS. 5*a*, 5*b* is different from that in FIGS. 4*a*, 4*b* in that it comprises a single motor instead of two.

The mechanical transmission means 6 in FIGS. 3*a*, 3*b* directly modifies the displacement of the pressure element 4 and indirectly modifies the displacement of the reclosable elements 7. On the other hand, the mechanical transmission means 6 of each of the embodiments in FIGS. 4*a*, 5*a* modifies the displacement of reclosable elements 7 by action at each hinge 80 and indirectly the displacement of the pressure element 4.

More specifically with reference to FIG. 9, each reclosable element 7 is an articulated capture arm 7 comprising three articulation segments 72, 74, 76 connected to each other through intermediate hinges 82, 84 similar to hinge 80. Each articulation segment 72, 74, 76 preferably comprises a plurality of recesses 73 to reduce the mass of the reclosable elements 7. The third articulation segment 76 is terminated by an end segment 78.

Unlike the capture device 1 shown in FIGS. 9 to 11, the capture device shown in FIG. 18 only comprises two articulation segments 74, 76 connected to each other by an intermediate hinge 84. More precisely, the connecting rod 64 is prolonged so as to form a first articulation segment 72 connected to the second articulation segment 74.

With reference to FIGS. 9 to 11, the reclosable elements 7 are configured to fold back into an additional position for transport of the device 1, called the transport position. The reclosable elements 7 are shown particularly in detail in the transport position in FIG. 11. The transport position preferably corresponds to the stable position of the reclosable elements 7 in which the lateral dimension of the capture device 1 is the smallest.

In the transport position, the third articulation segment 76 is configured to fold by fully covering the second articulation segment 74. The second hinge 82 is further away from the pressure plate 4 than the third hinge 84. The pressure plate 4 is practically in direct mechanical contact with the support 3. Preferably, the blocking means 9 of each hinge 80 is configured to retain each reclosable element 7 so as to prevent unwanted displacement of the reclosable elements 7 from the transport position to the open position.

Once again more specifically with reference to FIG. 9, each capture arm 7 also comprises a secondary contact element 5 free to move between an extended position and a position securing the captured space object 2. The secondary contact element 5 is configured to remain in the extended position for a given time during displacement of the reclosable element 7 from the open position to the closed position. In order to supply the mechanical energy necessary to secure the captured space object 2 to each secondary contact element 5, the capture device 1 comprises a passive mechanical energy storage system activated when the reclosable elements 7 are closed. The passive mechanical energy storage system particularly comprises springs 61 fixed on the reclosable elements 7.

In FIG. 9, each secondary contact element 5 is shaped like two curved strips 52, 54 each located at the end of a rod 56, 58 connected to the third hinge 84.

In the closed position, each secondary contact element 5 is configured to come into direct mechanical contact with the space object 2, which causes the third articulation segment 76 to fold around the space object 2, into the position to secure the captured space object 2. The shock absorber 400 is preferably present on each reclosable element 7, especially when the capture device 1 comprises a blocking means 9, so as to give preference to soft shocks from the space object 2 and reclosable elements 7. Furthermore, the shock absorber 400 and the reversible adhesive 500 are preferably present on each secondary contact element 5.

The configuration of the secondary contact elements 5 could be different from that shown in FIG. 9, for example similar to that of the reclosable elements 7, provided that they are configured to move from the extended position to the secure capture position with a delay after displacement of the reclosable elements 7 from the open position to the closed position.

Figure 17:
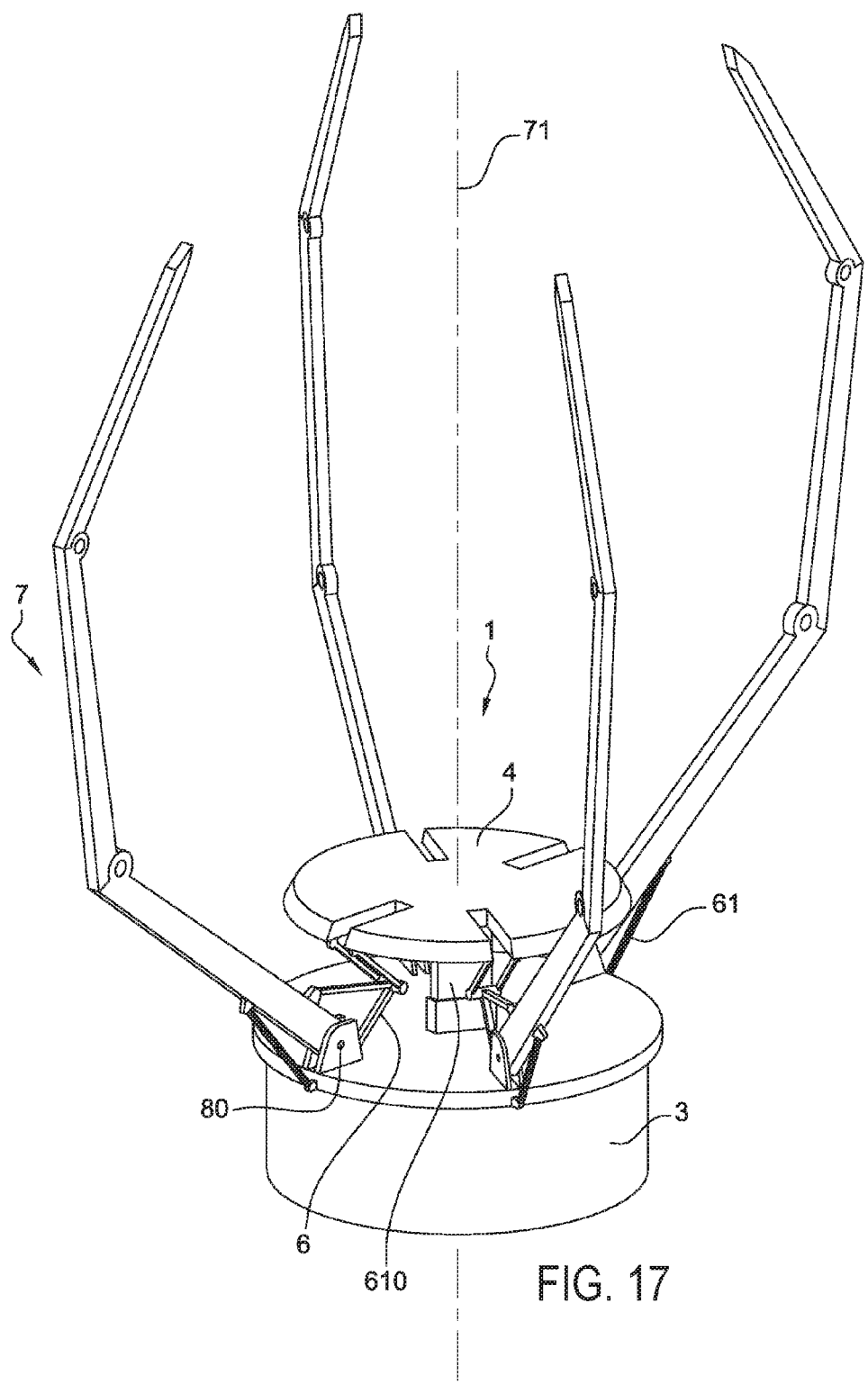
FIGS. 17 and 18 show two other preferred embodiments of the capture device.

The capture device in FIG. 17 is different from the capture device in FIGS. 1 to 10 and in FIG. 18, in that it is symmetric about an axis 71 orthogonal to the support 3.

FIGS. 11 to 14 show the method for extension of the capture device 1. In a first step shown in FIG. 12, the reclosable elements 7 pivot laterally about the hinge 80 while the pressure plate 4 is raised to the maximum. The articulation segments 74, 76 then pivot relative to the first articulation segment 72 about the hinge 82. Finally, the third articulation segment 76 pivots relative to the second articulation segment about the hinge 84 and finally moves into the open position shown in FIG. 14.

When the blocking means 9 are used to hold the capture device 1 in the transport position, the means of releasing the blocking means are actuated to enable displacement of the reclosable elements from the transport position to the open position.

Figure 15:
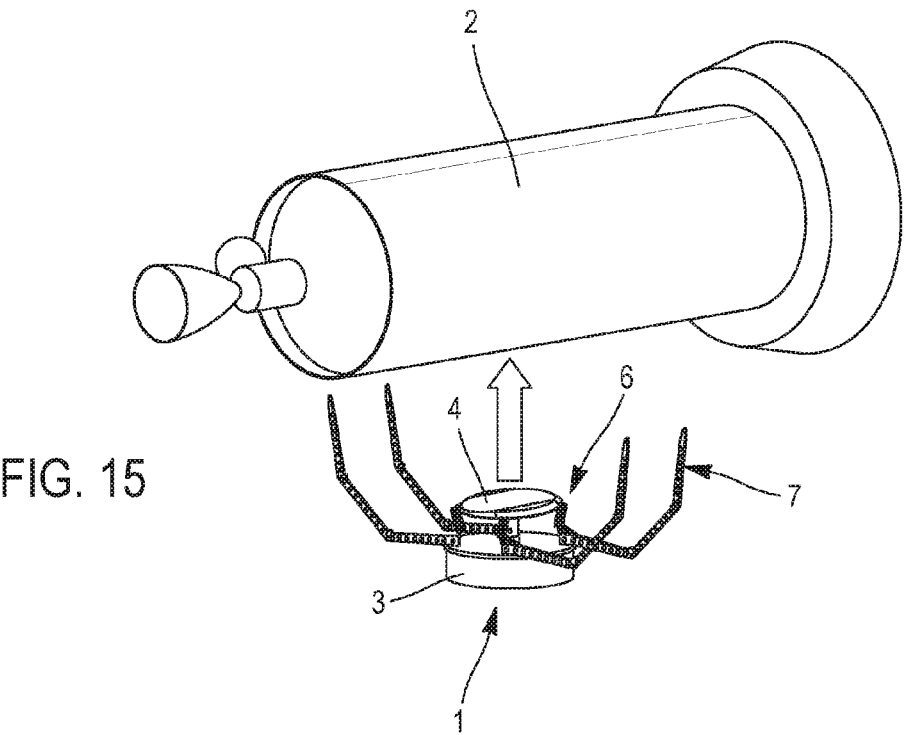
FIGS. 15 and 16 show the capture of two distinct types of space objects.
Figure 16:
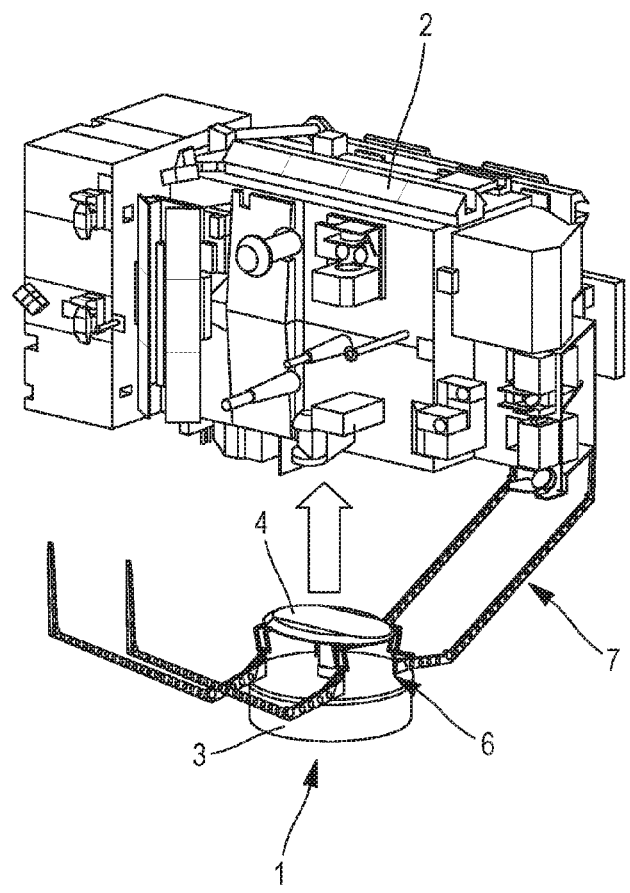

With reference to FIGS. 15 and 16, the figures show a method of capturing the different types of space objects 2. The space object 2 may be a part of a launcher, for example a standard upper stage of a rocket known under the name "Ariane 4" as shown in FIG. 15. It may also be a satellite or a part of a satellite shown in FIG. 16.

In particular, the capture device 1 shown in these two figures has approximately the same configuration despite the differences between these two types of space objects. The capture device in FIG. 16 is different from that in FIG. 15 particularly in that the reclosable elements are more elongated in shape in order to get a better grip on the satellite.

In the two cases, the method of capturing the space object 2 remains similar Shortly before capture, the capture device 1 moves towards the space object 2 at a controlled speed relative to the space object 2. The reclosable elements 7 are in the open position. The pressure plate 4 is raised so as to come into direct mechanical contact with the space object 2.

The pressure of the space object 2 on the pressure plate makes the pressure plate move downwards, preferably following a translation movement. Other movement types of the pressure plate 4 can also be envisaged, for example a spiral movement. The reclosable elements 7 only come into direct mechanical contact with the space object 2 when they are practically in the closed position.

Once the space object 2 has been captured, it may either be moved definitely away from the Earth, or it may be brought into the earth's atmosphere in order to be destroyed. In the first case, the capture device 1 can possibly be reused. In the second case, it would be feasible to reuse the capture device 1 by separating the space object 2 from the capture device 1 before using a dedicated means to bring the space object 2 into the atmosphere.

Obviously, those skilled in the art can make various modifications to the invention that has just been disclosed, without going outside the scope of the invention as disclosed.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An orbital device for capturing a space object, comprising:
   a pressure element configured to come into direct mechanical contact with the space object to be captured,
   a support,
   at least two reclosable elements free to move between an open position for capturing the the space object and a closed position for retaining the space object,
   an apparatus configured to mechanically transmit movement from the pressure element to each reclosable element, the mechanical transmission apparatus being configured to entrain each reclosable element in displacement between the open position and the closed position by pressure of the space object on the pressure element, the mechanical transmission apparatus comprising:
- at least one support bar on which the pressure element is located, the support bar being configured to move the pressure element in translation relative to the support,
- at least one connecting rod mechanically connecting the pressure element to one of the reclosable elements,
- at least one hinge located between the support and the at least two reclosable elements, the at least one connecting rod making the reclosable element pivot about the hinge during the translation displacement of the pressure element relative to the support, and
- a blocking member in the closed position of at least one of the reclosable elements, the blocking member preventing subsequent displacement of the reclosable element from the closed position against a mechanical energy stored during closing of the reclosable element.

2. The device according to claim 1, configured so that the pressure element comes into direct mechanical contact with the space object in the open position, before any direct mechanical contact between the reclosable elements and the space object.

3. The device according to claim 1, wherein the mechanical transmission apparatus comprises a mechanism arranged to release the blocking member.

4. The device according to claim 1, wherein the blocking member comprises a rack and at least one ratchet, the ratchet being configured to engage with the rack by forming a non-return device.

5. The device according to claim 1, wherein the blocking member comprises a notched wheel and at least one ratchet, the ratchet being configured to engage with the notched wheel by forming a non-return device.

6. The device according to claim 4, wherein a release mechanism of the blocking member comprises a wire fixed to the ratchet.

7. The device according to claim 1, wherein the blocking member comprises a notched wheel and at least one ratchet, the ratchet being configured to engage with the notched wheel by forming a non-return device, and wherein a wire passes approximately through the center of the notched wheel, the blocking member being released by tension on the wire from the center of the notched wheel.

8. The device according to claim 1, wherein each reclosable element is an articulated capture arm comprising a plurality of articulation segments.

9. The device according to claim 8, wherein each articulated arm is configured to fold back into an additional position for transport of the device.

10. The device according to claim 1, comprising at least a secondary contact element free to move between an extension position and a secure position for capturing the space object, the secondary contact element being configured to remain in the extension position during the displacement of the reclosable elements from the open position to the closed position.

11. The device according to claim 1, further comprising a mechanical shock absorber, present on at least one of the pressure element or on at least one of the reclosable elements.

12. The device according to claim 1, comprising a reversible adhesive comprising a plurality of filaments configured to form Van der Waals forces with the space object.

13. The device according to claim 1, wherein the mechanical transmission apparatus comprises a plurality of mechanical transmission elements, each directly mechanically connected to one of the reclosable elements or the pressure element, the reclosable elements and the mechanical transmission elements being arranged approximately symmetrically either by plane symmetry or by axial symmetry.

14. A device for capturing a space object, comprising:
- a pressure element configured to come into direct mechanical contact with the space object to be captured,
- a support,
- at least two reclosable elements free to move between an open position for capturing the the space object and a closed position for retaining the space object,
- an apparatus configured to mechanically transmit movement from the pressure element to each reclosable element, the mechanical transmission apparatus being configured to entrain each reclosable element in displacement between the open position and the closed position by pressure of the space object on the pressure element, the mechanical transmission apparatus comprising:
  - at least one support bar on which the pressure element is located, the support bar being configured to move the pressure element in translation relative to the support,
  - at least one connecting rod mechanically connecting the pressure element to one of the reclosable elements,
  - at least one hinge located between the support and the reclosable element, the connecting rod making the reclosable element pivot about the hinge during the translation displacement of the pressure element relative to the support,
  - wherein the mechanical transmission apparatus comprises a blocking member in the closed position of at least one of the reclosable elements,
  - wherein the blocking member comprises a rack and at least one ratchet, the ratchet being configured to engage with the rack by forming a non-return device, and
  - wherein a release mechanism of the blocking member comprises a wire fixed to the ratchet.

15. A device for capturing a space object, comprising:
- a pressure element configured to come into direct mechanical contact with the space object to be captured,
- a support,
- at least two reclosable elements free to move between an open position for capturing the the space object and a closed position for retaining the space object,
- an apparatus configured to mechanically transmit movement from the pressure element to each reclosable element, the mechanical transmission apparatus being configured to entrain each reclosable element in displacement between the open position and the closed position by pressure of the space object on the pressure element, the mechanical transmission apparatus comprising:
  - at least one support bar on which the pressure element is located, the support bar being configured to move the pressure element in translation relative to the support,
  - at least one connecting rod mechanically connecting the pressure element to one of the reclosable elements,
  - at least one hinge located between the support and the reclosable element, the connecting rod making the reclosable element pivot about the hinge during the translation displacement of the pressure element relative to the support, wherein the mechanical transmission apparatus comprises a blocking member in the closed position of at least one of the reclosable elements, wherein the blocking member comprises a notched wheel and at least one ratchet, the ratchet being configured to engage with the notched wheel by forming a non-return device, and wherein a wire passes approximately through the center of the notched wheel, the blocking member being released by tension on the wire from the center of the notched wheel.

* * * * *